(12) United States Patent
Plante et al.

(10) Patent No.: US 10,476,933 B1
(45) Date of Patent: Nov. 12, 2019

(54) DISTRIBUTED VEHICLE EVENT RECORDER SYSTEMS HAVING A PORTABLE MEMORY DATA TRANSFER SYSTEM

(71) Applicant: SmartDrive Systems, Inc., San Diego, CA (US)

(72) Inventors: James Plante, Del Mar, CA (US); Ramesh Kasavaraju, San Diego, CA (US)

(73) Assignee: SmartDrive Systems, Inc., San Diego, CA (US)

(*) Notice: Subject to any disclaimer, the term of this patent is extended or adjusted under 35 U.S.C. 154(b) by 195 days.

(21) Appl. No.: 15/592,009

(22) Filed: May 10, 2017

Related U.S. Application Data

(63) Continuation of application No. 14/935,247, filed on Nov. 6, 2015, now Pat. No. 9,679,424, which is a
(Continued)

(51) Int. Cl.
*H04N 5/77* (2006.01)
*H04L 29/08* (2006.01)
(Continued)

(52) U.S. Cl.
CPC .......... *H04L 67/06* (2013.01); *G06K 9/00791* (2013.01); *G07C 5/008* (2013.01);
(Continued)

(58) Field of Classification Search
CPC ...... B60W 2050/0089; G06K 9/00791; H04N 21/2747; H04N 21/41422; H04N 21/4223
(Continued)

(56) References Cited

U.S. PATENT DOCUMENTS

| 5,505,076 A | 4/1996 | Parkman |
| 6,317,682 B1 | 11/2001 | Ogura |

(Continued)

FOREIGN PATENT DOCUMENTS

WO  2004066275  8/2004

OTHER PUBLICATIONS

World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).
(Continued)

*Primary Examiner* — Dalena Tran
(74) *Attorney, Agent, or Firm* — Esplin & Associates, PC

(57) ABSTRACT

Data transfer systems for vehicle event recorders are provided as: a vehicle event recorder, a vehicle event recorder resident memory, and upload module in conjunction with, a communication port suitable for coupling with, a portable memory device, a server computer datastore, a server download module in conjunction with, a similar cooperating communications port. The portable memory device is arranged to operably couple with the communications ports of both the vehicle event recorder and the server computer and to be repeatedly moved between the two. The upload/download modules are arranged to transfer data to/from the portable memory in an orderly fashion in which no files are removed from the vehicle event recorder resident memory without first having been successfully transferred to the server computer datastore.

20 Claims, 4 Drawing Sheets

Related U.S. Application Data continuation of application No. 14/036,299, filed on Sep. 25, 2013, now Pat. No. 9,183,679, which is a continuation of application No. 13/539,312, filed on Jun. 30, 2012, now Pat. No. 8,571,755, which is a continuation of application No. 11/800,876, filed on May 8, 2007, now Pat. No. 8,239,092.

(51) Int. Cl.
*G06K 9/00* (2006.01)
*G07C 5/08* (2006.01)
*G07C 5/00* (2006.01)

(52) U.S. Cl.
CPC ............ *G07C 5/085* (2013.01); *G07C 5/0858* (2013.01); *G07C 5/0866* (2013.01); *H04N 5/77* (2013.01)

(58) Field of Classification Search
USPC ........ 701/33.4, 32.2, 31.5, 33.3, 36; 340/439
See application file for complete search history.

(56) References Cited

U.S. PATENT DOCUMENTS

| | | | |
|---|---|---|---|
| 6,526,352 B1 | 2/2003 | Breed | |
| 6,553,308 B1 | 4/2003 | Uhlmann | |
| 6,954,689 B2 | 10/2005 | Hanson | |
| 7,027,621 B1 | 4/2006 | Prokoski | |
| 7,596,439 B2 | 9/2009 | Oesterling | |
| 7,984,146 B2 | 7/2011 | Rozak | |
| 8,423,009 B2 | 4/2013 | Srinivasan | |
| 9,610,955 B2 | 4/2017 | Palmer | |
| 9,715,711 B1 | 7/2017 | Konrardy | |
| 9,754,325 B1 | 9/2017 | Konrardy | |
| 9,767,516 B1 | 9/2017 | Konrardy | |
| 9,786,154 B1 | 10/2017 | Potter | |
| 9,792,656 B1 | 10/2017 | Konrardy | |
| 9,805,423 B1 | 10/2017 | Konrardy | |
| 9,805,601 B1 | 10/2017 | Fields | |
| 9,858,621 B1 | 1/2018 | Konrardy | |
| 9,868,394 B1 | 1/2018 | Fields | |
| 9,870,649 B1 | 1/2018 | Fields | |
| 9,942,526 B2 | 4/2018 | Plante | |
| 1,036,073 A1 | 7/2019 | Palmer | |
| 2002/0156558 A1 | 10/2002 | Hanson | |
| 2002/0170064 A1 | 11/2002 | Monroe | |
| 2003/0055666 A1 | 3/2003 | Roddy | |
| 2003/0081123 A1 | 5/2003 | Rupe | |
| 2003/0137194 A1 | 7/2003 | White | |
| 2003/0154009 A1* | 8/2003 | Basir ...................... | G07C 5/085 701/32.2 |
| 2003/0201875 A1 | 10/2003 | Kuo | |
| 2004/0032493 A1 | 2/2004 | Franke | |
| 2004/0257208 A1 | 12/2004 | Huang | |
| 2005/0038581 A1 | 2/2005 | Kapolka | |
| 2005/0068417 A1 | 3/2005 | Kreiner | |
| 2005/0083404 A1 | 4/2005 | Pierce | |
| 2005/0171663 A1 | 8/2005 | Mittelsteadt | |
| 2005/0203683 A1* | 9/2005 | Olsen .................. | B60R 25/1004 701/29.3 |
| 2005/0205719 A1 | 9/2005 | Hendrickson | |
| 2005/0243171 A1 | 11/2005 | Ross, Sr. | |
| 2005/0258942 A1* | 11/2005 | Manasseh .............. | G07C 5/008 340/425.5 |
| 2006/0025907 A9 | 2/2006 | Kapolka | |
| 2006/0158349 A1 | 7/2006 | Oesterling | |
| 2006/0259933 A1 | 11/2006 | Fishel | |
| 2007/0088488 A1 | 4/2007 | Reeves | |
| 2011/0169625 A1 | 7/2011 | James | |
| 2012/0065834 A1 | 3/2012 | Senart | |
| 2013/0046449 A1 | 2/2013 | Yuecel Sermet | |
| 2013/0052614 A1 | 2/2013 | Mollicone | |
| 2013/0189649 A1 | 7/2013 | Mannino | |
| 2015/0015617 A1 | 1/2015 | Yeo | |
| 2015/0057512 A1 | 2/2015 | Kapoor | |
| 2015/0170428 A1 | 6/2015 | Harter | |
| 2016/0054733 A1 | 2/2016 | Hollida | |
| 2016/0182170 A1 | 6/2016 | Daoura | |
| 2017/0301220 A1 | 10/2017 | Jarrell | |
| 2018/0025636 A1 | 1/2018 | Boykin | |
| 2018/0033300 A1 | 2/2018 | Hansen | |
| 2019/0176847 A1 | 6/2019 | Palmer | |
| 2019/0180524 A1 | 6/2019 | Palmer | |

OTHER PUBLICATIONS

Written Opinion issued in PCT/US07/68328 dated Oct. 15, 2007. (3 pgs.).

Written Opinion of the International Searching Authority for PCT/US2006/47042, dated Feb. 25, 2008 (5 pages).

Written Opinion of the International Searching Authority for PCT/US2006/47055, dated Mar. 20, 2008 (5 pages).

"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.

"DriveCam Driving Feedback System", DriveCam brochure, Jun. 12, 2001, Document #6600128, 2 pages.

"DriveCam Driving Feedback System" DriveCam brochure, Mar. 15, 2004, 4 pages.

"DriveCam Passenger Transportation Module", DriveCam brochure, Oct. 26, 2001, 2 pages.

"DriveCam Video Event Data Recorder", DriveCam brochure, Nov. 6, 2002, Document #6600127, 2 pages.

"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.

"Sonic MyDVD 4.0: Tutorial: Trimming video segments". Tutorial for software bundled with Adaptec VideoOh! DVD USB 2.0 Edition, 2003, 13 pages.

"User's Manual for DriveCam Video Systems' HindSight 20/20 Software Version 4.0" DriveCam Manual, San Diego, 2003, Document #6600141-1, 54 pages.

Canadian Office Action issued in Application No. 2,632,685 dated Jan. 30, 2015; 5 pages.

Dan Maher, "DriveCam Taking Risk Out of Driving", DriveCam brochure folder, Jun. 6, 2005, 6 pages.

David Maher, 'DriveCam Brochure Folder', Jun. 6, 2005 (2 pg.).

Del Lisk, "DriveCam Training Seminar" Handout, 2004, 16 pages.

European Examination Report issued in EP 07772812.9 dated Jan. 22, 2015; 5 pages.

Jean (DriveCam vendor) "DriveCam Driving Feedback System", DriveCam brochure, Nov. 6, 2002, Document #6600128-1, 2 pages.

Notice of Allowance Application for U.S. Appl. No. 11/566,424, dated Feb. 26, 2010, 6 pages.

Notice of Allowance for U.S. Appl. No. 11/377,164, dated Dec. 3, 2014, 5 pages.

Notice of Allowance for U.S. Appl. No. 11/377,164, dated Feb. 13, 2015, 2 pages.

Notice of Allowance for U.S. Appl. No. 11/377,164, dated Feb. 25, 2014, 2 pages.

Notice of Allowance for U.S. Appl. No. 11/377,164, dated Nov. 18, 2013, 7 pages.

Notice of Allowance for U.S. Appl. No. 11/377,167, dated Apr. 1, 2015, 7 pages.

Notice of Allowance for U.S. Appl. No. 11/800,876, dated Apr. 19, 2012, 8 pages.

Notice of Allowance for U.S. Appl. No. 13/957,810, dated Jun. 8, 2015, 10 pages.

USPTO Final Office Action for U.S. Appl. No. 11/296,906, dated Aug. 8, 2012, 15 pages.

USPTO Final Office Action for U.S. Appl. No. 12/096,591, dated Dec. 5, 2014, 23 pages.

(56) References Cited

OTHER PUBLICATIONS

USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel 0BD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1.1.02, Jan. 2011, p. 21.
USPTO Non-Final Office Action dated Jan. 4, 2016 in U.S. Appl. No. 14/529,134, filed Oct. 30, 2014 (65 pgs).
PCT International Search Report and Written Opinion for PCT/IB16/51863, dated Sep. 16, 2016 (18 pgs.).
PCT International Search Report and Written Opinion for PCT/US2016/012757 dated Mar. 18, 2016 (11 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/IROS.2010.5650579 ISBN: 978-1-4244-6674-0.

* cited by examiner

DISTRIBUTED VEHICLE EVENT RECORDER SYSTEMS HAVING A PORTABLE MEMORY DATA TRANSFER SYSTEM

BACKGROUND OF THE INVENTION

Field

The following invention disclosure is generally concerned with vehicle event recorder systems and specifically concerned with data transfer between two primary nodes of a distributed vehicle event recorder system based upon a portable memory data transfer management schemes.

Prior Art

Vehicle event recorders are devices which record data relating to vehicle use on roads and highways, and this recorded data sometimes includes video data captured by a video camera. Data is recorded to a recording medium in an on-board system such as magnetic tape recorders. One well known device used in vehicle event recording systems is a common VHS system. In more modem vehicle event recorders systems, a "hard drive" type storage medium is winning favor as data transfer is greatly facilitated in such systems. In even more sophisticated systems, a high-performance inexpensive semiconductor memory is used to preserve data captured in a triggered vehicle event such as a vehicle crash or other accident.

In all of these cases, it is desirable to transfer information from the car to an administrator's workstation—not part of the vehicle—where the data can be reviewed and analyzed. For many years the most common way to transfer event record data merely meant removing a videotape from a VHS system installed in the trunk of the car and to play the videotape at a similar video player/recorder in an office or laboratory. Police automobiles generally used such systems and many arranged like this remain in widespread use today.

With recent improvements in digital technologies, modem systems are now arranged to record event record data on an on-board digital memory system. Either a hard drive type electro-mechanical memory or a semiconductor memory is suitable for recording data collected in a vehicle event recorder systems. To transfer data from a vehicle installation to an analysis computer, an administrator might plug-in a computer at a service garage to read stored data, Data stored in the vehicle event recorder memory is read by the computer and is sometimes transferred thereto for further processing. In most vehicle fleets using digital recorders today, a download technician goes from car-to-car with a laptop computer each night after vehicles have returned from their service day. It is a tedious task to manually read data from large fleet of vehicles and automated systems are becoming highly desirable.

In exceptionally advanced high-performance systems, a vehicle returning from a service day enters a Wi-Fi envelope or "hotspot", is detected and recognized, and a download operation transfers collected event record data from the vehicle to a centralized server resident memory. Human input is not required and the system is entirely automatic. A driver does not even need to be aware of the system's existence. Merely entering the download space, for example the vehicle parking facility, causes a complete data transfer with regard to any event record datasets captured during use of the vehicle. While these automated systems are state-of-the-art and extremely useful and efficient, they do not address all possible scenarios which remain of considerable interest.

Automated Wi-Fi systems are well suited for use with large vehicle fleets, however they are not always useful for vehicle event recorders arranged for individual or family use. Although Wi-Fi systems are generally available in many homes, in some cases a vehicle is not parked within range of a home Wi-Fi. In addition, not all users of vehicle event recorder systems are interested in configuring them for use in conjunction with a home Wi-Fi. In these cases it is desirable to provide for an easy and efficient data transfer scheme which does not require installation and maintenance of complex computing network equipment.

Even though high-performance vehicle event recorders used in these systems have a resident memory and that resident memory is specifically provided to store a plurality of event record datasets, for example even up to more than 100 event record datasets, the memory is not suitable for archiving data for extended periods. It is preferable to transfer event record data from the vehicle event recorder to a station where that data can be stored in a more permanent and secure fashion. Further, as vehicle event recorders do not provide for replay and analysis of event record data as they include no facility for that, it is intended that a vehicle event recorder capture data and preserve it in the short-term with the intention of transforming it to cooperating systems at a later time in a data transfer process.

While systems and inventions of the art are designed to achieve particular goals and objectives, some of those being no less than remarkable, these inventions have limitations which prevent their use in new ways now possible. Inventions of the art are not used and cannot be used to realize the advantages and objectives of the systems disclosed herefollowing.

SUMMARY OF THE INVENTION

Comes now, James Plante and Ramesh Kasavaraju with invention of distributed vehicle event recorder systems including devices and methods for transfer of data between nodes via a specially prepared portable memory.

Vehicle event recorder data transfer systems are devised and arranged about a portable memory device and scheme. In best modes, a "flash" type semiconductor memory device with a USB interface is provided to operate in conjunction with cooperating upload/download modules one each respectively in a vehicle event recorder and a remotely located application-specific server.

A download module of a server computer reads event record data information from a portable memory and marks the portable memory at a transfer status file to indicate successful data transfer has occurred. When the portable memory with the transfer status file is returned to the vehicle event recorder, the vehicle event recorder upload module checks the transfer status file and deletes data in the vehicle event recorder resident memory in accordance with information provided. In this way, only the event records which have been successfully transferred to the server datastore memory are subject to removal at the vehicle event recorder resident memory.

Vehicles equipped with vehicle event recorders of these inventions freely travel about roads and highways. In accordance with prescribed conditions, a vehicle event recorder may capture vehicle operation data in response to a detected or declared "event". Vehicle operation data may include numeric data provided by various of many vehicle sensors, in particular via an on-board controller area network, and in addition video data captured by an on-board video camera, part of a vehicle event recorder. When an event is declared, for example in collision where a shock detector exceeds a prescribed threshold, data is stored in a discrete event record dataset. The event record data is stored in a local or resident memory arranged with a capacity to hold tens or hundreds of similar event record datasets. While the resident memory of the vehicle event recorder is suitable for storing a great plurality of event record datasets it is not unlimited and the storage is to be considered temporary. At some point, data is copied to a more permanent system for analysis and archiving. To promote ease of data transfer, these vehicle event recorders are provided with a communications port suitable for coupling with a portable memory. In some best versions, a portable memory is arranged as a flash type semiconductor memory provided with a USB interface, a type "A" male connector for example. Accordingly, a vehicle event recorder is provided with the complementary type "A" female USB interface in preferred versions. Alternatives are possible. It is easy to appreciate that these systems arranged in conformance with the "CompactFlash" specification would work similarly well. Also, a standard known as "Secure Disk" provides a sufficient solution.

A vehicle event recorder provided with a USB communications port as described and further with supporting apparatus (upload module) to effect a data transfer between a resident memory and the portable memory, is suitable for use in conjunction with the spirit of this teaching. A vehicle having a vehicle event recorder as taught here involved in one or more events may be coupled to a USB flash type portable memory upon returning to a rest at the termination of a journey. The upload module detects the presence of the so coupled portable memory, checks a transfer status file, copies new event record data to the portable memory, removes old event record data at the vehicle event recorder resident memory as indicated in the transfer status file, or other suitable indicators, to have been successfully passed to a server for long-term storage. After new event record data is copied to the portable memory, a copy remains in the vehicle event recorder resident memory, the portable memory is transferred to the application-specific server computer system. The server computer is necessarily running a service (download module) which anticipates the arrival of the particular portable memory having recorded event record data thereon. General purpose computers not programmed with the special feature of a download module will not properly respond to insertion of the portable memory and will take no action necessary to properly handle these event record dataset files. When a portable memory does arrive at a prescribed and so prepared application specific server computer, the download module transfers/copies new event record data, verifies the integrity of the transfer, and finally prepares and writes a transfer status file to the portable memory to reflect the success or failure of a download with regard to each event record. When the portable memory is returned to vehicle event recorder, the transfer status file is interrogated such that the vehicle event recorder upload module can safely erase or overwrite memory allocated to event data no longer in need of protection due to successful transfer to the server.

The memory may be shuttled from and to between the vehicle event recorder and the server and in each step, the event records are transferred to the server and erased from the vehicle event recorder in agreement with the transfer status file as understood by the upload module of the vehicle event recorder and the download module of the server computer.

While the memory may be essentially the same as any other portable memory, the system distinguishes the memory by way of the transfer status file or other indicators of file transfer status. When a memory system not part of this invention (i.e. the transfer status file is absent) is inserted to either the vehicle event recorder or the server it will be interpreted by those devices as memory not part of this data transfer system.

Objectives of the Invention

It is a primary object of these inventions to provide vehicle event recorders in a distributed arrangement with data transfer mechanisms between primary nodes.

It is an object of these inventions to provide a coupling between a vehicle recorder system and an application specific remote server computer via a portable memory.

It is a further object to effect safe and reliable data transfer schemes between a vehicle and a cooperating server computer arranged as part of a vehicle event recorder system.

A better understanding can be had with reference to detailed description of preferred embodiments and with reference to appended drawings. Embodiments presented are particular ways to realize these inventions and are not inclusive of all ways possible.

Therefore, there may exist embodiments that do not deviate from the spirit and scope of this disclosure as set forth by appended claims, hut do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

GLOSSARY OF SPECIAL TERMS

Figure 1:
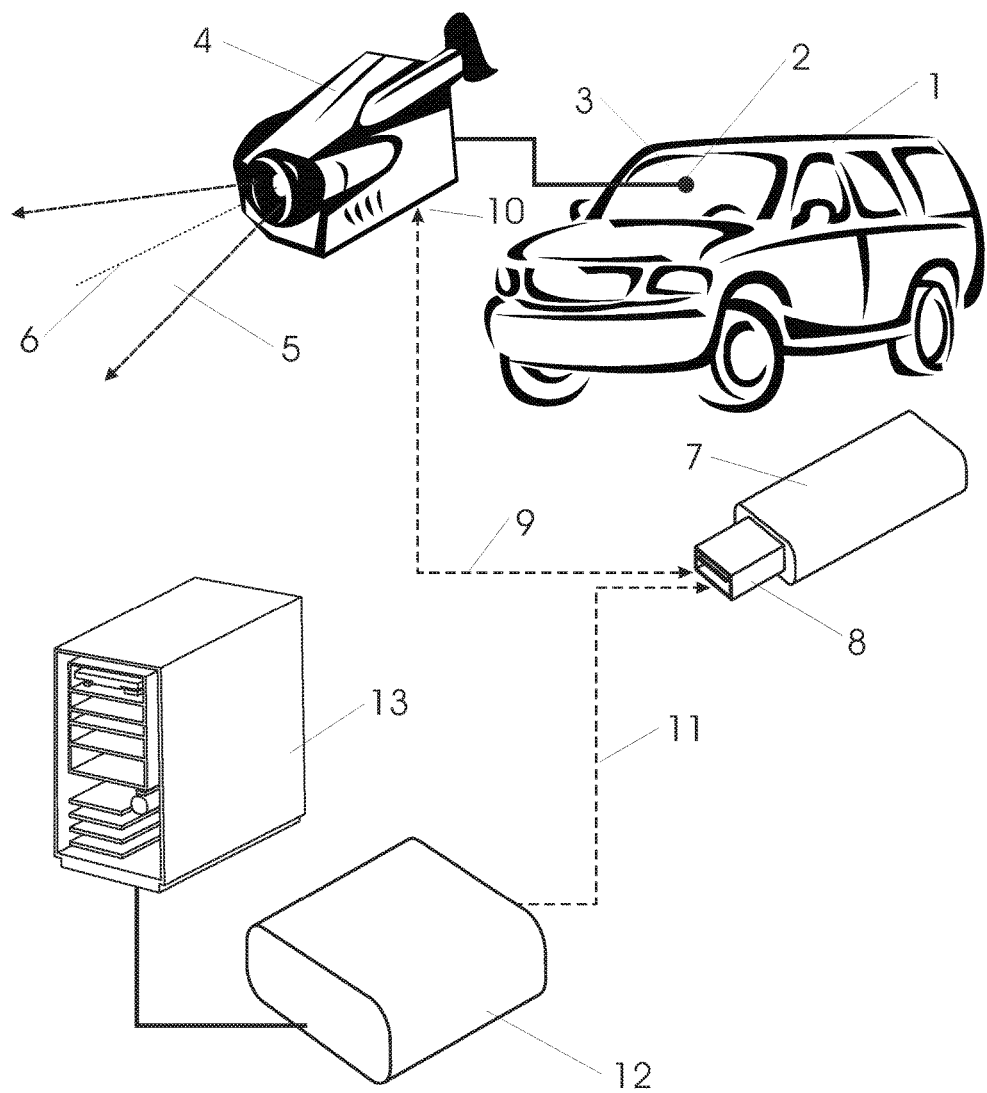
FIG. 1 is a perspective schematic drawing of an example version of a distributed vehicle event recorder system of this teaching; thereof.

Throughout this disclosure, reference is made to some terms which may or may not be exactly defined in popular dictionaries as they are defined here. To provide a more precise disclosure, the following term definitions are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Vehicle Event Recorder (Systems)

Vehicle event recorder systems are systems for recording data related to vehicle use including a video event recorder and supporting and cooperating apparatus.

Resident Memory

For purposes of the following disclosure and teaching, a 'resident memory' is memory installed as part of an on-board vehicle event recorder.

Portable Memory Portable memory is a small lightweight self-contained memory system arranged with facility which permits quick coupling and decoupling with cooperating systems.

Datastore Memory

For purposes of this disclosure, a datastore memory is a highly durable memory system suitable for long-term storage of digital data.

DETAILED DESCRIPTION OF THE INVENTION

Most generally a system in accordance with this teaching includes: an on-board vehicle event recorder, a portable memory device, and a cooperating remote server computer. In this arrangement, the on-board vehicle event recorder is entirely free from and without connection to the server. As such, a vehicle is completely free to travel without regard to any link or restriction with respect to a cooperating server. In contrast to on-board vehicle event recorder which couple with a server via a radio "hotspot" when the vehicle returns to a prescribed parking facility, the following systems do not require, a vehicle to return to a designated parking facility to effect download operations.

A portable memory is fashioned as a small lightweight and durable device easily handled by human operators and conveniently stored and transported as a self-contained system. A small plastic or metal case provides a durable container for a small digital memory system which may be installed and provided therein. In some versions, the digital memory system is preferably provided as semiconductor "flash" type memory. Semiconductor memory arranged as a non-volatile flash system provides a reliable memory system without moving parts. It is highly durable, small in size and inexpensive. Additionally, it does not require maintenance and operates for a very large number of cycles in a lifetime; it is safe to discard when its life has finally expired.

Alternatively, a portable 'hard drive' type memory system is a competing system which is particularly attractive in schemes where very high data storage capacity necessary. Hard drive systems having a capacity up to 100 GB are available in a portable package about the size of a deck of playing cards. Where transfer of very large amounts of data is required, versions may adopt these electro-mechanical memory systems characterized as a 'hard drive'.

In either case, a semiconductor memory or electro-mechanical hard drive memory, these systems are additionally provided with an interface system. Memory permanently installed in cooperation with typical computer systems do not require such interface systems. However as a portable memory is distinguished by its ability to repeatedly couple, and decouple from a communications port, a special interface suitable for supporting such coupling/decoupling is highly desirable in these systems. In a most preferred version, a portable memory is provided within a durable case and further communicatively connected to a Universal Serial Bus, USB type interface or commonly USB 'connector'. The USB type interface includes both a mechanical and communication protocol standard. The memory is joined with the physical connector such that when connection is made with a cooperating system, data from the memory is passed via the USB interface system and further into the connected device.

A USB interface is particularly attractive as it works well with either a flash semiconductor memory or an electro mechanical bard drive memory system. While certain flash devices are formed about their own useful connector interface standards, it would be unusual to adopt those standards in conjunction with a hard drive. However, both hard drive and flash memory systems are easily adopted to work with a USB interface. Adopting a USB interface is therefore attractive which it is desirable to enable systems for use with either flash type and bard drive type potable memory systems.

While USB is an important preferred arrangement, it is sometimes useful to adopt alternative interface systems which cooperate well with portable memory so long as it additionally cooperates well with a vehicle event recorder and related server computer more important example, a system known as a "Compact Flash" is a semiconductor memory with an included mechanical interface and a very compact included package. The Compact Flash standard accounts for both the package and the interface. Two rows of 25 connector sockets or receptacles (female) receive therein a cooperating arrangement of wire posts or studs (male). The memory is coupled to a cooperating system merely by aligning the connectors and pushing them together such that electrical contact between studs and receptacles is made. Pins are sometimes exposed to forces which tend to bend or otherwise cause damage to the connector. Otherwise, the Compact Flash standard is an excellent candidate about which these systems might be based.

A very similar portable flash memory arrangement is provided via a competing standard known as "Secure Digital". Secure Digital flash includes a more durable connector arranged as a planar compound connector of 18 elements arranged in a spatial distribution which mates with a suitable receiving unit. As such, there are no pins to bend or otherwise damage. Accordingly, the Secure Digital connector is an excellent candidate for these systems which might demand a large number of coupling/decoupling cycles.

Either standard including the Compact Flash or Secure Digital flash work quite well in various versions of systems presented here which include portable memory arranged as flash type semiconductor memory. The interfaces associated with Compact Flash and Secure Digital are useful with a semiconductor potable memory, but are not generally used with hard drive systems—although they are not necessarily excluded as such and are explicitly anticipated here.

While the flash memory interfaces described are well known and in widespread use, these interfaces cooperate particularly well with vehicle event recorders. A special synergy exists between a vehicle event recorder system and these portable memories. Vehicle event recorders have attributes associated therewith which are not part of other systems where such portable memory is used. Accordingly, there is a special advantage to be realized when choosing memory interfaces for use in cooperation with vehicle event recorders which is not obvious with regard to memory selection for portable music players or digital cameras for example. Portable music players and cameras are not generally mounted rigidly in a fixed position in close proximity to a large substantially planar or concave immovable object (i.e. a windshield). Accordingly, vehicle event recorders have access restrictions which demand that only certain types of systems be coupled therewith. As such, interfaces which permit good coupling of portable memory to vehicle event recorders without requiring disturbance of the vehicle event recorder with respect to its mount are particularly useful. Use of these interfaces include benefits not found in more common uses of portable memory.

Vehicle event recorders of these systems include video recorders coupled to capture video images which relate to vehicle use. Traffic views, views of the operator space, among possibly others, may be captured by digital imaging devices or 'video cameras'. Vehicle event recorders are most preferably mounted behind a windscreen near its upper center. For this arrangement, the device may be optically coupled to the spaces ahead of the vehicle in the direction of travel, and by way of a rear-view camera, simultaneously to the vehicle operator compartment. To effect this it is best if the device is mounted near and quite rigidly to the windshield in the interior portion of the vehicle driver's compartment. In such position, physical access to the device is somewhat compromised. In some cases, a rear-view mirror further restricts access. However, with an appropriately placed and arranged communications port interface, a portable memory can be operably coupled to the vehicle event recorder in its fixed position such that it is easy for an unskilled operator to couple and decouple a portable memory thereto.

In particular, a USB connector is well-suited because establishing a connection requires just a little force. Interfaces requiring large forces tend to disturb the alignment of the cameras axes and should be avoid ed. In addition, the physical connector is quite small and only requires a translation or movement of about 1 cm to make the connection. In the constrained spaces associated with typical vehicle event recorder installations, this is a useful advantage. Although a CompactFlash electrical connector requires a bit more force, the required 'throw' is small. Additionally, CompactFlash connectors can be arranged with cooperating mechanical means (levers and alignment indices) to promote good alignment and more certain physical coupling. Secure Disk type flash connectors similarly require little space to couple and decouple a portable memory to a vehicle event recorder having obstructed access due to its installation configuration.

Each of these three mentioned interface systems, USB, Compact Flash, Secure Digital among some others cooperate well with the physical nature of an installed server and workstation computers and of their peripheries which may include those to couple with such portable memory systems. The server and workstations computers portion of these networks may be arranged as a typical computer installation with prescribed application specific software. As such, without special structural arrangement these systems support complete use with portable memories in the arrangements proposed above. A server computer couples and decouples in a conventional way with a portable memory via standard peripherals which are commonly available.

Thus one best version of the invented body includes a vehicle event recorder system of the following components in combination: a vehicle event recorder, a portable memory and a remote server computer. Further these components include an arrangement where the portable memory is fashioned with a single interface to couple with both the vehicle event recorder and a server computer. Still further, that it may be repeatedly coupled and decoupled from either the vehicle event recorder and server computer by way of a mechanical aspect of a provided interface system.

Preferred Embodiments of the Invention

The following presentation is provided including illustrative examples and includes description relating to ways to make and use the systems. It will be appreciated that each of the embodiments described include an apparatus and method and that the apparatus and method of one preferred embodiment may be different than the apparatus and method of another embodiment. Accordingly, limitations presented in one example should not be carried forward and implicitly assumed to be part of an alternative example.

With reference to the drawing figures, one will appreciate further detail of these distributed vehicle event recorder systems and the connections between its primary elements by way of a portable memory system. FIG. 1 illustrates important general versions and relationships between primary components thereof. A vehicle 1 is prepared with an on-board video event recorder 2 affixed and mounted therein. Just behind the vehicle windshield 3 in an upper central region, a vehicle event recorder may be rigidly fastened thereto such that a video camera 4 has its field-of-view 5 and optic axis 6 pointing forward into traffic. Because the vehicle event recorder is fully self-contained receiving power from the vehicle and provided with a resident memory, the device is operable despite being completely disconnected and not in communication with any computer network or power grid. As such, the vehicle is free to travel any place a vehicle might go without regard to a network connection.

A portable memory 7 is formed of a protective shell or casing, a connection interface 8 and an internal electronic or electro-mechanical memory system, for example semiconductor the flash memory or spinning disk hard drive. The interface depicted in the drawing is in conformance with the USB standard type "A" type connector. As such, it may be connected to and coupled with 9 cooperating systems having complementary "A" type USB connectors. A vehicle event recorder fitted with a communications port including a similar hut opposing gender USB connector 10 permits the portable memory to be connected to the vehicle event recorder whereby data may be passed in both directions; that is from the vehicle event recorder to the portable memory and in the other direction from the portable memory to the vehicle event recorder.

In particular, event record dataset files in the vehicle event recorder resident memory may be copied to the portable memory for later transfer to a cooperating server computer. Further, control files or other file transfer indications can be transferred from the portable memory to the vehicle event recorder (not necessarily to the resident memory systems but rather they may be merely read by a microprocessor and used in at a local RAM). The same portable memory device when decoupled from the vehicle event recorder is suitable for easy transport—i.e. it is no longer connected to the vehicle and is free to be carried to places where vehicles could not normally go. The portable memory may be coupled 11 to a computer periphery system such as a Compact Flash reader device, or alternatively a simple USB port 12. The USB port including both electro-mechanical connection and communications protocol permits the portable memory to be coupled to the server computer 13 in a similar manner that it is connected to the vehicle event recorder.

To bring about this relationship, the mechanical portion of the interface is arranged such that the gender of the vehicle event recorder connector and the server computer connector are the same and the gender of the portable memory connector is the opposite of those two. Accordingly, the same portable memory system can be coupled with the vehicle event recorder and the server computer.

Figure 2:
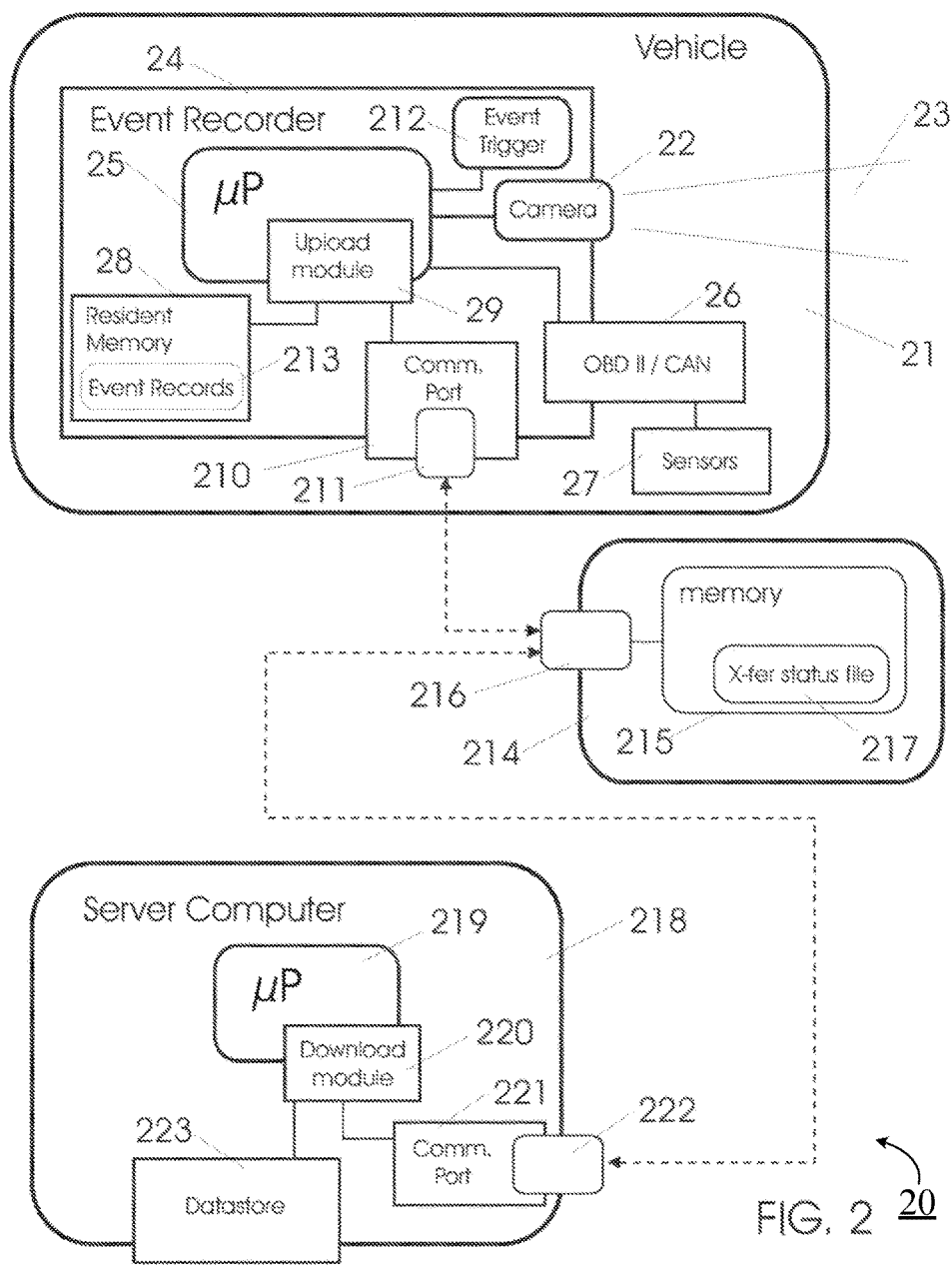
FIG. 2 is a detailed block diagram of these systems including major components

The block diagram of FIG. 2 presents a system 20 in greater detail, including a vehicle 21, portable memory device 214, and a server computer 218. A Vehicle 21 equipped with a vehicle event recorder is mounted and affixed behind the windshield of a motor vehicle whereby a video camera 22 field-of-view 23 is coupled to an environment about the vehicle, for example a traffic view or a vehicle operator view. The vehicle event recorder 24 having primary components including: a microprocessor or microcontroller 25; in some versions, a data acquisition system standard in most vehicles, an on-board diagnostic system 26; and associated sensors 27; a resident memory system 28; an upload module 29; a communications port 210; having an electro-mechanical interface 211, is preferably arranged as shown in the diagram. An event trigger 212 sets into motion a process where an event record 213 is created and stored in the resident memory. These elements are in cooperation and work in concert with each other—more particularly as illustrated by the indicated pathways presented in the drawing. That is, sensor transducers provide signals to a controller area network or on-board diagnostic system; and those signals are further received at the vehicle event recorder microprocessor. Similarly, a camera provides data, in particular video data relating to vehicle use, to the microprocessor. Event records stored in memory can be passed by and upload manager via a communications port to an external memory, a portable memory which may be removed thereafter from the vehicle event recorder for transport to cooperating stations.

Portable memory device 214 formed of a protective shell and case, additionally a memory core 215 which is preferably arranged in best systems as a flash semiconductor memory, and a communications port interface 216. The interface is provided such that the portable memory can be coupled to the vehicle event recorder and other systems. In some best versions, indicators 217 may be provided in the memory such that upload and download managers can determine the transfer status of particular event record datasets. Thus, in some versions a portable memory is distinct because it includes means to facilitate and assure proper upload/download actions.

Finally a server computer 218 including a microprocessor 219 and closely coupled download manager 220 is electronically coupled to communications port 221 which includes a suitable electro-mechanical interface 222. which matches, albeit with opposing gender, to that of the portable memory. A datastore 223 provides long-term archiving and secure storage of event record data. Review and analysis may be taken up against event records captured by a vehicle and be performed at the server or connected workstations at any time without regard for any connection to the vehicle in which data was acquired.

For a more complete understanding the following description is provided to address actions taken when a portable memory is coupled and decoupled to a VER and cooperating server computer. When a portable memory is introduced at the communications port of a vehicle event recorder, its presence is detected automatically and its presence triggers a data transfer action. A vehicle event recorder upload module looks for and attempts to read a transfer status file or other indicators on the portable memory.

Transfer status indicators are provided to signal whether a successful data transfer has occurred for each of a plurality of event records. Event records in the vehicle event recorder resident memory which previously have been successfully transferred (copied) to the server computer as indicated by an event record identity or handle as part of the transfer status file of the portable memory are then marked by the upload module for an erase operation, overwrite operation, or otherwise "okay for obliteration".

Once a portable memory is removed from the communications port at the vehicle event recorder, it is portable and free to be moved to remote systems. The portable memory is thereafter coupled with a prescribed server equipped with a communications port suitable for receiving portable memory therein. Similarly with respect to the vehicle event recorder, a specially configured download module at the server detects introduction of the portable memory and executes operations particular to these systems. That is, the memory is searched for new event records; i.e. event records not present in the server datastore memory. Where these event records are found, a transfer step moves and/or copies them to the server memory, while not essential, it is sometimes preferred that the portable memory is cleared of data (erased) after a transfer has occurred. Transferred data might be checked against the data in the portable memory in a data integrity verification step. After it is verified that the data transferred to the server computer is whole, the portable memory can be manipulated. In one such operation, an event record transfer status file may be written to the portable memory. A transfer status file includes indication for each event record that the data was successfully transferred, or not. This may be taken up as a binary indicator being associated with any particular identifier or handle. When the portable memory is returned to the vehicle event recorder, the upload module there can act upon and respond to the indicators provided in the event record transfer status file.

Figure 3:
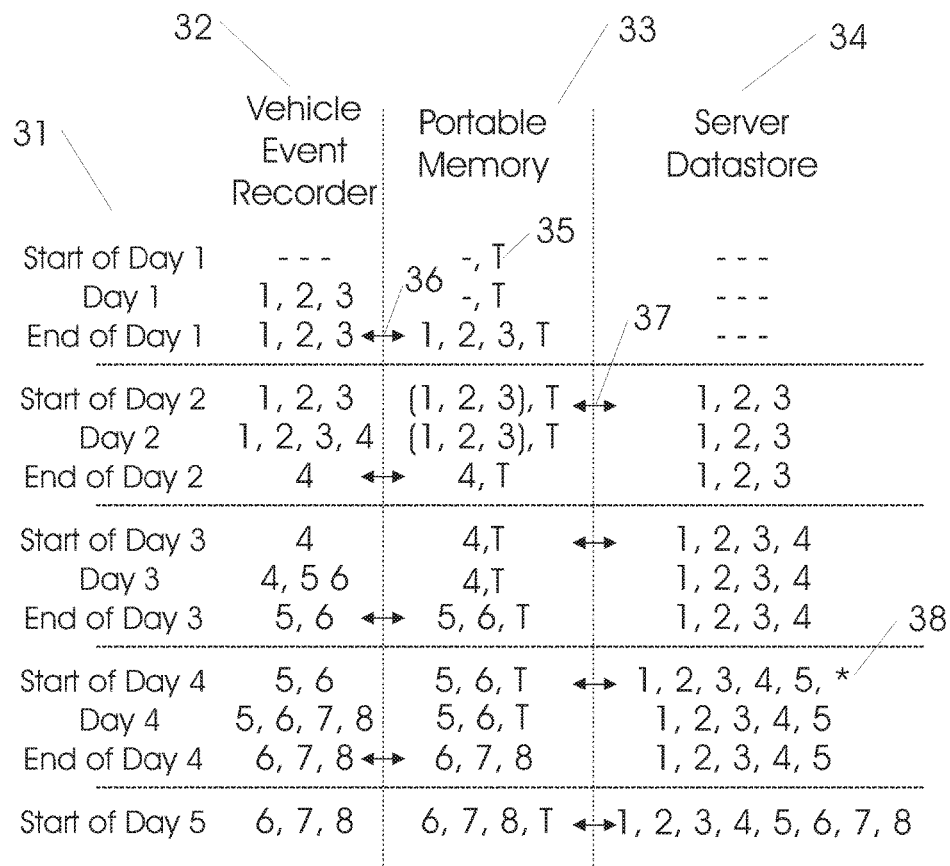
FIG. 3 is a general flow diagram of methods first proposed herein.
Figure 4:
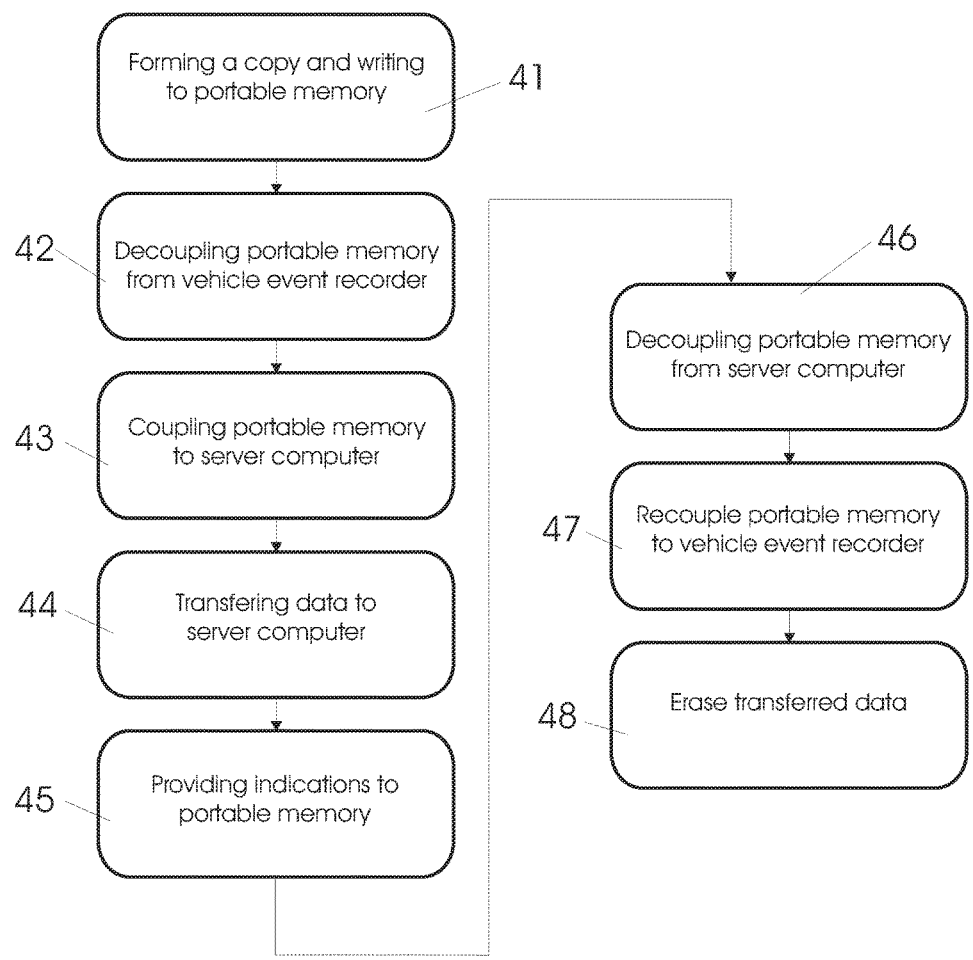
FIG. 4 is matrix description of a timeline illustrating the memory states of three key components.

The following example is provided to illustrate use of the system with particular regard to a file transfer timeline (represented as column 31 in the Figure). With reference to the matrix presented as FIG. 3, the illustration assumes the following: 1) each day a vehicle with a vehicle event recorder goes out and is exposed to traffic events; 2) at the end of each of service today, the vehicle event recorder is coupled with a prescribed portable memory; 3) at the beginning of each service day the portable memory is coupled to an application-specific server computer.

On the start of the Day 1, the resident memory of the vehicle event recorder 32, the portable memory 33 and the server computer datastore memory 34 are all empty and contain no event record data. (However the portable memory may be initialized with a special service file to indicate its authority to both the vehicle event recorder and the server). During the first use of the vehicle on Day 1, three event record data sets ER 1, ER2, and ER3 (indicated in the drawing as 1, 2, 3) are recorded and written to the resident memory of the vehicle event recorder as the vehicle is in use and as the events occur.

At the end of Day 1, the portable memory is connected 36 to the vehicle event recorder by way of its USB communications port. Event record data is copied from the vehicle event recorder resident memory to the portable memory. The upload module first detects the presence of the portable memory, checks its authorization to ensure it is a memory in conformance with the task at hand, and copies event record data to the portable memory. ER1, ER2 and ER3 are copied to the device. After the upload is completed, the portable memory contains ER 1, ER2, and ER3. In addition, it contains the transfer status file T. The server memory remains empty at the end of the Day 1. The portable memory is decoupled from the vehicle event recorder.

At the start of Day 2, the portable memory is coupled 37 to the server at a communications port having a compatible interface. A download module running as a service on the server computer detects the presence of a portable memory, authenticates it as a vehicle event recorder related device, copies its event record data to a server datastore, verifies the integrity of the copied data, and writes a transfer status file to the portable memory. In this example, all three event record's ER 1, ER2, and ER3 are successfully transferred and that is indicated in the transfer status file. At the start of Day 2, the vehicle event recorder memory has ERL ER2, and ER3, the server has ER 1, ER 2, and ER3. The portable memory has an updated transfer status file [provided by the server computer after the successful download. It is optional whether or not the portable memory preserves the event record data—that is, it may be erased or left intact without effect. During the Day 2, the vehicle encounters another event, and the fourth event record is written to the vehicle event recorder resident memory—ER4, As such, the vehicle event recorder memory includes the following data late in Day 2: ER1, ER2, ER3, and ER4. Although ER1, ER2, and ER3 have been copied to the server, they (a copy) remain in the vehicle event recorder resident memory.

Until the portable memory is returned to the vehicle event recorder and interrogated for indications which suggest the success or failure of file transfers, a copy is maintained in the portable memory. When the portable memory is reintroduced to the vehicle event recorder (at the end of Day 2), the upload module reads indicators at the portable memory to learn successful download has occurred with respect to ER 1, ER2, and ER3; accordingly, the upload module clears memory space previously occupied by data of ER1, ER2, and ER3. The only event record data remaining in the resident memory is that of ER4. A copy of ER4 is made to the portable memory by the upload module. Server data store maintains its copy of ER1, ER2, and ER3. At the start of Day 3 when the portable memory is re-connected to the server computer the server computer sees ER4, knows it is a new event record not present in the datastore, and downloads a copy, verifies its integrity, and prepares a transfer status file 'T' with indicators that a successful transfer has occurred.

When the portable memory is returned to the vehicle event recorder at the end of Day 3, ERA is erased as the upload manager learns of the earlier successful transfer at the server computer. In addition, copies of newly acquired event ER5 and ER6 are written to choose the portable memory. At the start of Day 4 when the portable memory is connected to the server an attempt is made to download event record's ER5 and ER6; however although ER5 downloads correctly, ER6 fails (for purposes of this example) as indicated by the asterisk 38. The transfer status file is marked to indicate successful transfer of ER5 and an error (or silence) with regard to ER6. When the portable memory is reintroduced to the vehicle event recorder, it detects (from examination of indicators in the transfer status file) that ER6 was not properly received. Accordingly, the upload module responds by writing a new copy of ER6 to the portable memory. In addition, as newly acquired event record's ER7 and ER8 now are in the vehicle event recorder resident memory, they too are copied to the portable memory at the end of Day 4. At the start of Day 5, ER6, ER7, and ER8 are copied to the server datastore. The server datastore then has a complete library of event records ERI-ER8 despite one transfer error having occurred. This example illustrates the power of the system to ensure all event records arrive safely at server computer before they are erased at the vehicle event recorder.

Methods in accordance with systems taught here are readily understood in view of the detailed disclosure here-following. In a first step, event records which have been collected over a brief and finite period of time, for example a single vehicle service today or perhaps several days, is copied 41 from the vehicle event recorder resident memory to a portable memory which has been temporarily coupled to the vehicle event recorder at a communications port provided therein. An upload manager (an upload manager is the portion of an upload module which executes coded logic instructions) may be triggered to perform such upload action upon introduction of a portable memory at the communications port. The upload manager examines a newly introduced portable memory for indications of previous data transfer and responds to these indications by removing data remaining in the vehicle event recorder resident memory to free space for event records to occur in the future.

Thereafter, the upload manager reviews information stored locally in the resident memory to see if there exist any event records which may have not yet completed a successful transfer to the server. In the case that event record data exists, a copy is formed and that copy is written to the portable memory. In some versions, a control file is made to indicate which files are the files newly added to the portable memory. Other indicators may be provided.

In a following step 42, the portable memory is disconnected or decoupled from the vehicle event recorder. Because of its highly portable nature, it may be easily transported to any location and the data of the portable memory is free and no longer confined and bound to the vehicle which otherwise restricts its ability to be used at a server computer.

The portable memory after being suitably transported to a prescribed server computer or workstation, is coupled 43 therewith. The device may be inserted or otherwise "plugged-in" such that a communications path is enabled between the portable memory and the server computer. Server computers of these systems are specifically programmed to receive vehicle event record data. A download module detects newly presented memory devices at the communications port. If the memory inserted is merely a standard memory with no event record datasets and no control files thereon, the download manager takes no further action and the portable memory is treated as if it is not part of the system but a general purpose memory suitable for common uses.

The down load module interrogates the attached portable memory to learn whether it contains new event record files not previously downloaded. If that is the case, the download module sets into action a transfer 44 of new event record datasets to the server and connected datastore memory. Once files are copied over to the server, the integrity of the files is checked. Where files are verified transferred in good order, the portable memory is modified 45 to include indicators of that. That is, an event record-by-event record indication of success is written to the portable memory. Where a file transfer failure occurs, an event record is not marked as successfully transferred an d it is subject to being re-loaded in the next cycle. In a future cycle, the memory is decoupled 46 from the server computer, recoupled to the vehicle event recorder 47. The resident memory of the vehicle event recorder can then be cleared 48 of all data indicated as successfully transferred. One will appreciate that as a copy remains in the resident memory at the vehicle event recorder, it can be replaced in a future transaction. This scheme assures that data files are not removed from the vehicle event recorder until they have been verified as being successfully transferred to the server. The portable memory is free to be decoupled from the server and returned to the vehicle event recorder. When the portable memory is reinserted into the vehicle event recorder can indications for, the upload module discovers the file transfer status, fix example by interpreting indications provided in a transfer status file.

The examples above are directed to specific embodiments which illustrate preferred versions of devices and methods of these systems. In the interests of completeness, a more general description of devices and the elements of which they are comprised as well as methods and the steps of which they are comprised is presented herefollowing.

One will now fully appreciate how distributed vehicle event recorders having a plurality of nodes may be coupled together in a data transfer coupling by way of a portable memory system including both apparatus and methods. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

What is claimed is:

1. A system comprising:
    a communication port interface (216) configured to facilitate communication with portable memory, wherein the portable memory is configured to electronically store information, wherein the information includes one or more event record data sets and a transfer status file, wherein individual event record data sets include image data and vehicle information captured by a camera and one or more sensors that are mounted in a vehicle and/or carried by the vehicle;
    datastore (223) configured to electronically store information; and
    a microprocessor (219) configured to:
        detect whether the transfer status file includes one or more indications that individual ones of the one or more event record data sets have not yet been successfully transferred from the portable memory to the datastore;
        responsive to detection of the one or more indications, facilitate transfer of the one or more event record data sets from the portable memory to the datastore;
        verify whether the one or more event record data sets have been successfully transferred to the datastore; and
        write, through the communication port interface, information to the transfer status file on the portable memory to include, in the transfer status file, one or more success indications that individual ones of the one or more event record data sets have been successfully transferred from the portable memory to the datastore.

2. The computing system of claim 1, further comprising:
    a vehicle event recorder comprising:
        a vehicle communication port interface (211) configured to facilitate communication with the portable memory,
        resident storage (28) configured to electronically store information, wherein the information includes one or more event record data sets, wherein individual event record data sets include image data and vehicle information captured by the camera and the one or more sensors that are mounted in the vehicle and/or carried by the vehicle, wherein the one or more event record data sets include copies of the one or more event record data sets stored on the portable memory; and
        a vehicle microprocessor configured to:
            detect whether the transfer status file on the portable memory includes one or more success indications that individual ones of the one or more event record data sets have been successfully transferred from the portable memory to the datastore of the computing system; and
            responsive to detection of the one or more success indications, mark the copies of the one or more event record data sets that correspond to the detected one or more success indications for erasing and/or overwriting.

3. The computing system of claim 2, wherein the vehicle microprocessor of the vehicle event recorder is further configured to:
    detect whether the transfer status file includes one or more error indications that individual ones of the one or more event record data sets have not yet been successfully transferred either from the resident storage to the portable memory or from the portable memory to the datastore;
    responsive to detection of the one or more error indications, facilitate transfer of the one or more event record data sets that correspond to the detected one or more error indications from the resident storage to the portable memory.

4. The system of claim 3, wherein the vehicle event recorder includes an on-board diagnostics system configured to associate data provided by the on-board diagnostics system with captured image data, and wherein the event record datasets include data provided by the on-board diagnostics system.

5. The computing system of claim 2, wherein the microprocessor is further configured to:
    responsive to transfer of the one or more event record data sets from the resident storage to the portable memory, and subsequent to establishment of a communicative coupling from the portable memory via the communication port interface to the datastore, facilitate transfer of the one or more event record data sets that correspond to the detected one or more error indications from the portable memory via the communication port interface to the datastore.

6. The computing system of claim 2, wherein the vehicle event recorder further includes the camera and the one or more sensors,
    wherein the camera is configured to capture image data, wherein the camera has a field of view arranged to include an environment in and/or around the vehicle,
    wherein the one or more sensors are configured to generate output signals conveying the vehicle information, wherein the vehicle information is related to operation of the vehicle,
    wherein the vehicle microprocessor is further configured to:
        detect vehicle events based on the generated output signals, create the event record datasets responsive to detection of the vehicle events, wherein the event record datasets include the captured image data and the vehicle information, and effectuate storage of the event record datasets in the resident storage.

7. The system of claim 2, wherein the vehicle communication port interface includes an electromechanical coupling operable for repeated coupling and decoupling.

8. The system of claim 1, wherein the communication port interface includes an electromechanical coupling operable for repeated coupling and decoupling.

9. The system of claim 8, wherein the electromechanical coupling conforms to protocol and structure defined in at least one of USB flash, CompactFlash, and Secure Disk flash.

10. The system of claim 1, wherein at least one of the individual ones of the one or more event record data sets corresponds to a collision involving the vehicle.

11. A method for storing and transmitting vehicle event records between a system and a portable memory, wherein the system includes datastore (223), the method comprising:

facilitating, by a communication port interface (216) of the system, communication with the portable memory, wherein the portable memory electronically stores information, wherein the information includes one or more event record data sets and a transfer status file, wherein individual event record data sets include image data and vehicle information captured by a camera and one or more sensors that are mounted in a vehicle and/or carried by the vehicle;

detecting whether the transfer status file includes one or more indications that individual ones of the one or more event record data sets have not yet been successfully transferred from the portable memory to the datastore;

responsive to detection of the one or more indications, facilitating transfer of the one or more event record data sets from the portable memory to the datastore;

verifying whether the one or more event record data sets have been successfully transferred to the datastore; and writing, through the communication port interface, information to the transfer status file on the portable memory to include, in the transfer status file, one or more success indications that individual ones of the one or more event record data sets have been successfully transferred from the portable memory to the datastore.

12. The method of claim 11, further comprising:

storing, in resident storage (28), one or more event record data sets, wherein individual event record data sets include image data and vehicle information captured by the camera and the one or more sensors that are mounted in the vehicle and/or carried by the vehicle, wherein the one or more event record data sets include copies of the one or more event record data sets stored on the portable memory;

detecting whether the transfer status file on the portable memory includes one or more success indications that individual ones of the one or more event record data sets have been successfully transferred from the portable memory to the datastore of the system; and responsive to detection of the one or more success indications, mark the copies of the one or more event record data sets that correspond to the detected one or more success indications for erasing and/or overwriting.

13. The method of claim 12, further comprising:

detecting whether the transfer status file includes one or more error indications that individual ones of the one or more event record data sets have not yet been successfully transferred either from the resident storage to the portable memory or from the portable memory to the datastore;

responsive to detecting the one or more error indications, facilitating transfer of the one or more event record data sets that correspond to the detected one or more error indications from the resident storage to the portable memory.

14. The method of claim 13, further comprising:

associating, by an on-board diagnostics system, data provided by the on-board diagnostics system with captured image data, and wherein the event record datasets include data provided by the on-board diagnostics system.

15. The method of claim 12, further comprising:

responsive to transfer of the one or more event record data sets from the resident storage to the portable memory, and subsequent to establishment of a communicative coupling from the portable memory via the communication port interface to the datastore, facilitating transfer of the one or more event record data sets that correspond to the detected one or more error indications from the portable memory via the communication port interface to the datastore.

16. The method of claim 12, further comprising:

capturing, by the camera, image data, wherein the camera has a field of view arranged to include an environment in and/or around the vehicle;

generating, by the one or more sensors, output signals conveying the vehicle information, wherein the vehicle information is related to operation of the vehicle;

detecting vehicle events based on the generated output signals;

creating the event record datasets responsive to detection of the vehicle events, wherein the event record datasets include the captured image data and the vehicle information; and effectuating storage of the event record datasets in the resident storage.

17. The method of claim 12, wherein the vehicle communication port interface includes an electromechanical coupling operable for repeated coupling and decoupling.

18. The method of claim 11, wherein the communication port interface includes an electromechanical coupling operable for repeated coupling and decoupling.

19. The method of claim 18, wherein the electromechanical coupling conforms to protocol and structure defined in at least one of USB flash, CompactFlash, and Secure Disk flash.

20. The method of claim 11, wherein at least one of the individual ones of the one or more event record data sets corresponds to a collision involving the vehicle.

* * * * *